Patented Sept. 4, 1934

1,972,419

UNITED STATES PATENT OFFICE 1,972,419

BASE-EXCHANGING SUBSTANCE

Robert Griessbach, Wolfen, near Bitterfeld, Germany, assignor to I. G. Farbenindustrie Aktiengesellschaft, Frankfort-on-the-Main, Germany No Drawing. Application March 10, 1932, Serial No. 598,099. In Germany March 26, 1931

2 Claims. (Cl. 23—111)

My present invention relates to a new process for the production of base-exchanging substances and more particularly to a process for providing such products from native or artificial aluminium silicates showing originally no base-exchanging qualities at all or only in such a diminished degree that they are practically valueless for the purpose set forth.

A variety of minerals or rocks have already been converted into base-exchanging substances by treatment with chemical agents.

It has now been ascertained in accordance with my present invention that base-exchanging substances of any convenient grain size, high strength and high capacity, can be obtained by treating native or artificial aluminium silicates, that are, chemically, of a highly resistant character, crushed to the desired grain-size, superficially with fused alkali hydroxide. Feldspar, feldspar substitutes, pyroxenes and amphiboles, pitchstones, clay shales, glasses, clinkers and generally those aluminium silicates which are not decomposed when treated with hot concentrated hydrochloric acid, are particularly suitable for this purpose. These aluminium silicates originally have no or only a practically useless base-exchanging property, since they do not contain chemically bound water, that means, that they are unhydrated aluminium silicates. Inasmuch as these silicates contain silicic acid in an amount surpassing that of the basic constituents, they are acid minerals.

The aluminium silicate is superficially attacked during this treatment, without its internal strength being affected, but the attack—and consequently the capacity of the end product—can be increased by a short heating at higher temperatures, which must be below the melting point of the mixture. The optimum quantity of alkali, and also the best temperature and duration of the heating, depend on the nature, for instance, the porosity of the carrier material, and can be easily ascertained by a preliminary experiment, the object being particularly to obtain, in addition to high capacity, firm adhesion of the activated layer on the mineral substratum. I prefer to use such an amount of an alkali metal hydroxide that the grains to be superficially converted into base-exchanging compounds, are evenly covered with the melted alkali, that the mixture, however, remains its crumbly form even when heated to the desired temperature without sticking together. The duration of the treatment varies between about ¼ to about 1 hour. After hydration, a test shall not essentially lose in weight by washing away silicic acid or aluminium oxide.

The material prepared in this manner, is then subjected to a process of hydration, by means of water or vapors, or both, the surplus alkali and other water-soluble constituents being removed. The resulting base-exchanger displays capacities up to 2CaO and over, and when exhausted, can be revived with solutions of common salt and the like, in known manner.

The presence of carbon dioxide, for example from fire gases, should be prevented as far as is possible during the heating process, since the formation of sodium or potassium carbonate greatly reduces the action of the caustic alkali.

According to a known process, readily decomposable minerals, that means, minerals which are decomposed by strong mineral acids, such as zeoliths or aluminium hydrosilicates are heated with alkali hydroxides or carbonates at temperatures at which the mass consolidates, that is to say, to sintering temperature at least, the molten alkali being intended to penetrate and decompose the nuts of mineral completely. The consolidation should proceed to such a degree that the pieces of mineral do not crumble down to powder during the subsequent treatment with water.

In contradistinction thereto, the present process starts with widely accessible minerals, which are not hydrosilicates and therefore are difficult to decompose and are of predetermined final grain size. By employing restricted amounts of strong caustic alkalis at moderate temperature and for a short period the intention is to obtain only a superficial attack of the material, the solid mineral core being retained, thereby furnishing a filtering material having any low filtration resistance.

The method of operating according to the present invention possesses the advantage, over the known treatment of feldspars and the like with caustic alkali solutions under pressure—so that the resulting base-exchanging mass has to be subsequently formed into shape—that the grain size and structure of the mineral are retained during the activation process.

*Example 1.*—200 parts of a coal shale, crushed to a grain size of 3-5 mm., are stirred into 75 parts of fused sodium hydroxide of 100% strength at about 350° C., in an iron pan. The crumbly mass is then heated at 400-500° C. in a preheated, closed crucible for about 30 minutes. When cold, the mass is introduced into running water and washed until free from alkali. The resulting base-exchanger contains 15 to 25% of water, in the airdry condition, has a capacity of 1.5 to 2.0, and is of approximately the same grain size as the originating mineral.

The sodium hydroxide may be replaced by potassium hydroxide, the higher melting point of which even offers certain advantages.

*Example 2.*—200 parts of a commercial orthoclase, crushed to a grain size of 1 to 3 mm., are preheated and intimately mixed with 100 parts of fused sodium hydroxide of about 100% strength at about 350° C. The resulting crumbly mass is passed through a rotary-tube furnace, internally heated with hydrogen gas at 600 to 700° C. The material, which is discharged at the end of 15 to 20 minutes, is allowed to fall, when cooled, into a vessel filled with condensed water, and provided with a screen, in which the bulk of the alkali is extracted. The screen and its contents are then placed in running water, until the washings cease to give any reaction for free alkali. The product has a capacity of about 2.1, referred to the dry material, and the original grain size is retained.

It has also been ascertained that, by performing the activation on a larger scale, especially in the case of somewhat more readily attackable but likewise unhydrated minerals, such as certain feldspars, alkali-hornblendes and the like, it is possible to prevent undue attack on the mineral (and therefore extensive extraction of alumina and silica in the subsequent washing) in a still more certain manner by modifying the action of the caustic alkalis by a suitable addition of neutral salts.

Such buffer substances comprise, more particularly, alkali metal salts of low melting point, such as nitrates, nitrites, borates, phosphates and the like which yield a clear melt with the alkali. Mostly, small quantities, ranging up to about 25% of the amount of the alkali, will suffice. In this manner, losses due to excessive decomposition of the aluminium silicate can be kept down more effectually than by cutting down the amount of alkali, the temperature and duration of heating.

The resulting crumbly sintered masses are then washed and treated in the usual manner.

The addition of the buffer substances furnishes base-exchangers of very uniform action. Though their capacity is slightly lower than when pure caustic alkali is used, the products show more uniform decomposition and, for the most part, higher mechanical strength.

*Example 3.*—100 parts of fused sodium hydroxide are treated with 10 parts by weight of borax, and the resulting melt is intimately mixed with 200 parts of granulated feldspar (grain size 3 to 5 mm.). The mixture is heated for three quarters to one hour at 400° C. When cold, the decomposition product is freed from soluble constituents, especially surplus alkali, in running water in known manner. The resulting product has a capacity of approximately 1, and very good mechanical strength. Borax may be replaced by about 5 parts by weight of sodium nitrate, with similar results.

The alkali may be washed out with steam, instead of running water, the alkali having a condensing action on the steam and passing into solution. In this manner, base-exchangers are obtained with higher powers of resistance than those exhibited when water at elevated temperatures is used.

What I claim is:—

1. A process for converting unhydrated acid aluminium silicates into base-exchanging compounds by superficial activation, which comprises forming a crumbly mixture of the grained silicate with fused alkali in an amount sufficient to cover completely the silicate grains, heating the mixture to a temperature below its sintering point and subsequently hydrating the product.

2. A process for converting unhydrated acid aluminium silicates into base-exchanging compounds by superficial activation, which comprises forming a crumbly mixture of the grained silicate with fused alkali and an alkali metal salt yielding a clear melt with the alkali, the alkali being present in an amount sufficient to cover completely the silicate grains, heating the mixture to a temperature below its sintering point and subsequently hydrating the product.

ROBERT GRIESSBACH.